(12) United States Patent
Park et al.

(10) Patent No.: US 12,710,676 B2
(45) **Date of Patent: *Aug. 18, 2026**

(54) DISPLAY APPARATUS AND LIGHT SOURCE DEVICE THEREOF

(71) Applicant: SAMSUNG ELECTRONICS CO., LTD., Suwon-si (KR)

(72) Inventors: Chunsoon Park, Suwon-si (KR); Sungyeol Kim, Suwon-si (KR); Kyehoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/204,094

(22) Filed: May 9, 2025

(65) Prior Publication Data

US 2025/0264762 A1 Aug. 21, 2025

Related U.S. Application Data

(63) Continuation of application No. 18/807,275, filed on Aug. 16, 2024, now Pat. No. 12,321,063, which is a (Continued)

(30) Foreign Application Priority Data

Jan. 4, 2021 (KR) ........................ 10-2021-0000570
Feb. 3, 2021 (KR) ........................ 10-2021-0015150
Jun. 1, 2021 (KR) ........................ 10-2021-0070750

(51) Int. Cl.
*G02F 1/1335* (2006.01)
*G02F 1/13357* (2006.01)

(52) U.S. Cl.
CPC .. *G02F 1/133607* (2021.01); *G02F 1/133603* (2013.01); *G02F 1/133605* (2013.01)

(58) Field of Classification Search
CPC ......... G02F 1/133607; G02F 1/133603; G02F 1/133605; G02F 1/133608
See application file for complete search history.

(56) References Cited

U.S. PATENT DOCUMENTS 7,566,160 B2 7/2009 Song et al.
8,547,499 B2 10/2013 Yoshikawa
(Continued)

FOREIGN PATENT DOCUMENTS

CN 202813036 U 3/2013
CN 106444158 A 2/2017
(Continued)

OTHER PUBLICATIONS

English translation of Yamamoto JP-2017157278-A (Year: 2017).*
(Continued)

*Primary Examiner* — Evan P Dzierzynski
(74) *Attorney, Agent, or Firm* — Sughrue Mion, PLLC

(57) ABSTRACT

A light source device comprises a diffuser plate and a light source module disposed behind the diffuser plate. The light source module includes a substrate, a plurality of light emitting diodes mounted on the substrate, and a plurality of reflective layers each provided on a front surface of the plurality of light emitting diodes. When a distance between the centers of each of the plurality of light emitting diodes is referred to as a pitch, and a distance between the diffuser plate and the substrate is referred to as an optical distance, a ratio of the pitch to the optical distance satisfies the following expression: 2.5≤pitch/optical distance≤4.5.

19 Claims, 13 Drawing Sheets

Related U.S. Application Data continuation of application No. 18/474,565, filed on Sep. 26, 2023, now Pat. No. 12,181,745, which is a continuation of application No. 17/864,934, filed on Jul. 14, 2022, now Pat. No. 11,809,042, which is a continuation of application No. 17/349,550, filed on Jun. 16, 2021, now Pat. No. 11,422,407, which is a continuation of application No. PCT/KR2021/002227, filed on Feb. 23, 2021.

(56) References Cited

U.S. PATENT DOCUMENTS

| | | | | |
|---|---|---|---|---|
| 9,069,110 | B2 | 6/2015 | Lee et al. | |
| 10,866,460 | B2 | 12/2020 | Mukhtarov et al. | |
| 10,948,775 | B2 | 3/2021 | Hashimoto et al. | |
| 11,262,620 | B1 | 3/2022 | Kim et al. | |
| 2005/0001537 | A1 | 1/2005 | West | |
| 2006/0193148 | A1 | 8/2006 | Bang | |
| 2010/0321421 | A1 | 12/2010 | Kee | |
| 2011/0013116 | A1* | 1/2011 | Matsuki | G02F 1/133603 362/235 |
| 2011/0051397 | A1 | 3/2011 | Bae et al. | |
| 2012/0086885 | A1 | 4/2012 | Yokota | |
| 2012/0147292 | A1* | 6/2012 | Kasano | G02F 1/1335 257/E33.072 |
| 2013/0135844 | A1 | 5/2013 | Chang et al. | |
| 2016/0044776 | A1 | 2/2016 | Park et al. | |
| 2017/0017121 | A1 | 1/2017 | Park et al. | |
| 2017/0122503 | A1 | 5/2017 | Ozaki et al. | |
| 2018/0114884 | A1* | 4/2018 | Kim | G02F 1/133603 |
| 2018/0136520 | A1 | 5/2018 | Kim | |
| 2019/0285942 | A1 | 9/2019 | Liu et al. | |
| 2020/0285117 | A1 | 9/2020 | Hashimoto et al. | |
| 2020/0371397 | A1 | 11/2020 | An et al. | |
| 2021/0119087 | A1 | 4/2021 | Kim | |
| 2021/0200026 | A1* | 7/2021 | Sonobe | G02F 1/133605 |
| 2021/0208330 | A1 | 7/2021 | Sun et al. | |

FOREIGN PATENT DOCUMENTS

| | | | | |
|---|---|---|---|---|
| CN | 111668202 | A | | 9/2020 |
| JP | 2009 87879 | A | | 4/2009 |
| JP | 2011-137856 | A | | 7/2011 |
| JP | 2017157278 | A | * | 9/2017 |
| KR | 10-2011-0121595 | A | | 11/2011 |
| KR | 10 2011 0126577 | A | | 11/2011 |
| KR | 10-2012-0023184 | A | | 3/2012 |
| KR | 10-2017-0049802 | A | | 5/2017 |
| KR | 10-1758821 | B1 | | 7/2017 |
| KR | 10-2020-0037429 | A | | 4/2020 |
| WO | 2019/046328 | A1 | | 3/2019 |
| WO | 2020/025054 | A1 | | 2/2020 |

OTHER PUBLICATIONS

Communication dated Feb. 22, 2024, issued by the European Patent Office in European Application No. 21 863 036.6.
Communication issued Aug. 16, 2022 by the European Patent Office in European Patent Application No. 21863036.6.
Communication issued Jul. 4, 2023 by the European Patent Office in counterpart European Patent Application No. 21863036.6.
Communication dated Sep. 24, 2021, issued by the International Searching Authority in counterpart International Application No. PCT/KR2021/002227 (PCT/ISA/210).
U.S. Appl. No. 18/807,275, filed Aug. 16, 2024.
U.S. Appl. No. 18/474,565, filed Sep. 26, 2023.
U.S. Appl. No. 17/864,934, filed Jul. 14, 2022.
U.S. Appl. No. 17/349,550, filed Jun. 16, 2021.
Communication dated Nov. 29, 2025 issued by the China National Intellectual Property Administration in Chinese Patent Application No. 202180005597.7.

* cited by examiner

DISPLAY APPARATUS AND LIGHT SOURCE DEVICE THEREOF

CROSS-REFERENCE TO RELATED APPLICATIONS

This application is a continuation of U.S. application Ser. No. 18/807,275, filed on Aug. 16, 2024, which is a continuation of U.S. application Ser. No. 18/474,565, filed on Sep. 26, 2023, now U.S. Pat. No. 12,181,745, issued on Dec. 31, 2024, which is a continuation of U.S. application Ser. No. 17/864,934, filed on Jul. 14, 2022, now U.S. Pat. No. 11,809,042, issued on Nov. 7, 2023, which is a continuation of U.S. application Ser. No. 17/349,550, filed on Jun. 16, 2021, now U.S. Pat. No. 11,422,407, issued on Aug. 23, 2022, which is a bypass continuation application of International Application No. PCT/KR 2021/002227, filed on Feb. 23, 2021, which claims priority from Korean Patent Application No. 10-2021-0000570, filed on Jan. 4, 2021, Korean Patent Application No. 10-2021-0015150, filed on Feb. 3, 2021, and Korean Patent Application No. 10-2021-0070750, filed on Jun. 1, 2021, in the Korean Intellectual Property Office, the disclosures of which are incorporated herein by reference in their entireties.

BACKGROUND

1. Field

The present disclosure relates to a display apparatus and a light source device thereof, and more particularly, to a display apparatus including an improved optical structure and a light source device thereof.

2. Description of Related Art

Generally, a display apparatus converts obtained or stored electrical information into visual information and displays the visual information to a user. The display apparatus is used in various fields, such as home or workplace.

The display apparatus includes a monitor apparatus connected to a personal computer or a server computer, a portable computer device, a navigation terminal device, a general television apparatus, an Internet Protocol television (IPTV), a portable terminal device, such as a smart phone, a tablet PC, a personal digital assistant (PDA) or a cellular phone, various display apparatuses used to reproduce images, such as advertisements or movies in an industrial field, or various kinds of audio/video systems.

The display apparatus includes a light source module configured to convert electrical information into visual information, and the light source module includes a plurality of light sources configured to independently emit light.

Each of the plurality of light sources includes, for example, a light emitting diode (LED) or an organic light emitting diode (OLED). For example, the LED or the OLED may be mounted on a circuit board or a substrate.

SUMMARY

The present disclosure is directed to providing a display apparatus at a reduced cost.

Further, the present disclosure is directed to providing a display apparatus with a reduced thickness.

An aspect of the present disclosure provides a light source device including a diffuser plate and a light source module disposed behind the diffuser plate. The light source module includes a substrate, a plurality of light emitting diodes mounted on the substrate, and a plurality of reflective layers each provided on a front surface of the plurality of light emitting diodes. When a distance between centers of each of the plurality of light emitting diodes is referred to as a pitch and a distance between the diffuser plate and the substrate is referred to as an optical distance, the pitch and the optical distance satisfy the following expression:

$$2.5 \leq \text{pitch/optical distance} \leq 4.5.$$

The light source module may include a plurality of optical domes each configured to cover the plurality of light emitting diodes.

The plurality of reflective layers may be provided to allow main light, which is emitted from the plurality of light emitting diodes, to have an angle that is greater than or equal to 50° but less than or equal to 65° with respect to a front and rear direction.

The reflective layer may be provided as a Distributed Bragg Reflector (DBR).

The pitch may be greater than or equal to 4 mm but less than or equal to 14 mm.

The optical distance may be greater than or equal to 1.5 mm but less than or equal to 4.5 mm.

The plurality of light emitting diodes may be arranged along a first direction and a second direction perpendicular to the first direction, and the pitch may be set to a first distance in the first direction that is greater than a second distance in the second direction.

A relationship between first distance in the first direction and the second distance in the second direction satisfies the following expression:

$$(\text{first distance}) \leq 1.1 * (\text{second distance}).$$

If the pitch is a maximum value and the optical distance is greater than or equal to 1.5 mm but less than or equal to 2.5 mm, a ratio of the pitch to the optical distance satisfies the following expression:

$$3.5 \leq \text{pitch/optical distance} \leq 4.5.$$

If the pitch is a maximum value and the optical distance is greater than or equal to 2.5 mm but less than or equal to 3.5 mm, a ratio of the pitch to the optical distance satisfies the following expression:

$$3.2 \leq \text{pitch/optical distance} \leq 4.2.$$

If the pitch is a maximum value and the optical distance is greater than or equal to 3.5 mm but less than or equal to 4.5 mm, a ratio of the pitch to the optical distance satisfies the following expression:

$$2.5 \leq \text{pitch/optical distance} \leq 3.5.$$

The plurality of optical domes may be formed of silicone or epoxy resin.

The light emitting diode may be configured to emit blue light.

Another aspect of the present disclosure provides a display apparatus including a light source device configured to output light, and a liquid crystal panel configured to block or transmit the light. The light source device includes a diffuser plate and a light source module disposed behind the diffuser plate. The light source module includes a substrate, a plurality of light emitting diodes mounted on the substrate and arranged along a first direction and a second direction different from the first direction, and a plurality of optical domes each configured to cover the plurality of light emitting diodes. When a distance between centers of each of the plurality of light emitting diodes is referred to as a pitch and a distance between the diffuser plate and the substrate is referred to as an optical distance, a ratio of the pitch to the optical distance satisfies the following expression:

$$2.2 \leq \text{pitch/optical distance} \leq 4.5.$$

The light source module may include a plurality of reflective layers each provided on a front surface of the plurality of light emitting diodes.

The plurality of reflective layers may be provided to allow main optical, which is emitted from the plurality of light emitting diodes, to have an angle that is greater than or equal to 50° but less than or equal to 65° with respect to a front and rear direction.

The pitch may be set to a first distance in the first direction that is greater than a second distance in the second direction and a relationship between the first distance in the first direction and the second distance in the second direction satisfies the following expression:

$$(\text{first distacne}) \leq 1.1 * (\text{second distance}).$$

When the pitch is a maximum value and the optical distance is greater than or equal to 1.5 mm but less than or equal to 2.5 mm, a ratio the pitch to the optical distance satisfies the following expression:

$$3.5 \leq \text{pitch/optical distance} \leq 4.5.$$

When the pitch is a maximum value and the optical distance is greater than or equal to 2.5 mm but less than or equal to 3.5 mm, a ratio of the pitch to the optical distance may satisfies the following expression:

$$3.2 \leq \text{pitch/optical distance} \leq 4.2.$$

When the pitch is a maximum value and the optical distance is greater than or equal to 3.5 mm but less than or equal to 4.5 mm, a ratio of the pitch to the optical distance satisfies the following expression:

$$2.2 \leq \text{pitch/optical distance} \leq 3.5.$$

Another embodiment of the disclosure provides a light source device including: a diffuser plate; and a light source module disposed behind the diffuser plate, wherein the light source module includes: a substrate; a plurality of light emitting diodes mounted on the substrate; and a plurality of reflective layers provided on a front surface of the plurality of light emitting diodes, and wherein, when a distance between centers of the plurality of light emitting diodes is a pitch, and a distance between the diffuser plate and the substrate is as an optical distance, a ratio of the pitch to the optical distance satisfies the following expression:

$$2.5 \leq \text{pitch/optical distance} \leq 4.5.$$

According to yet another embodiment of the disclosure, a display apparatus includes a light source device configured to output light; and a liquid crystal panel configured to block or transmit the light, wherein the light source device includes: a diffuser plate; and a light source module disposed behind the diffuser plate, wherein the light source module includes: a substrate; a plurality of light emitting diodes mounted on the substrate and arranged along a first direction and a second direction different from the first direction; and a plurality of optical domes configured to cover the plurality of light emitting diodes, and wherein, when a distance between centers of the plurality of light emitting diodes is a pitch, and a distance between the diffuser plate and the substrate is an optical distance, a ratio of the pitch to the optical distance satisfies the following expression: $2.2 \leq \text{pitch/optical distance} \leq 4.5$.

In yet another aspect of the disclosure a display apparatus includes a light source device configured to output light; a liquid crystal panel configured to block or transmit the light. The light source device including a diffuser plate and a light source module disposed behind the diffuser plate. The light source module including a substrate, a plurality of light emitting diodes mounted on the substrate and arranged along a first direction and a second direction different from the first direction, and a plurality of optical domes configured to cover the plurality of light emitting diodes. When pitch is defined as a distance between centers of adjacent light emitting diodes on the substrate and optical distance is defined as a distance between the diffuser plate and the substrate, a ratio of the pitch to the optical distance satisfies the following expression:

$$3.5 \leq \text{pitch/optical distance} \leq 4.5,$$

and wherein the plurality of reflective layers output light emitted from the plurality of light emitting diodes, with a full width half maximum that is greater than or equal to 50° but less than or equal to 65°.

The display apparatus described herein may include a reduced number of light sources, thereby reducing a cost of the display apparatus.

The display apparatus described herein has a reduced optical distance, thereby reducing a thickness of the display apparatus.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
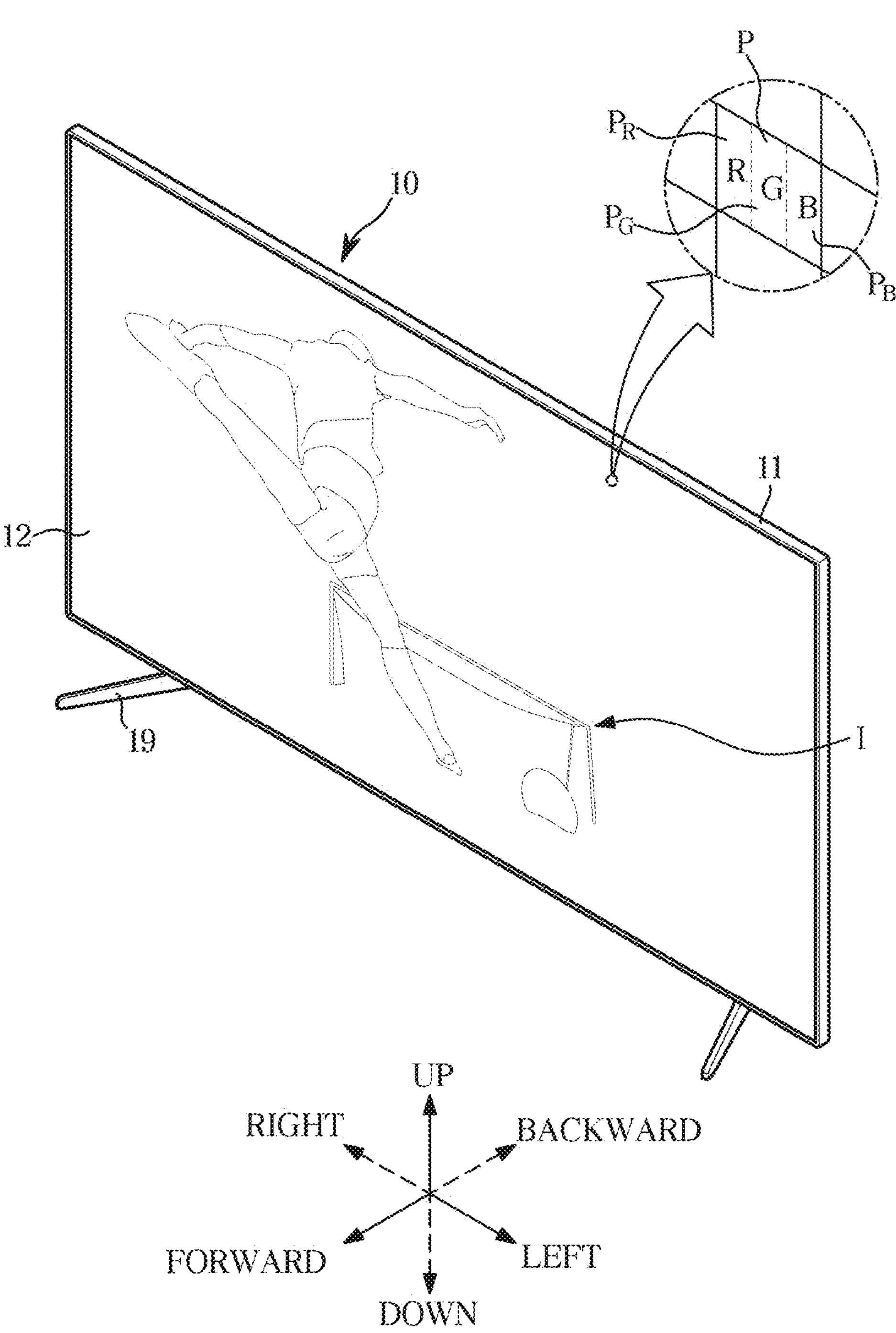
FIG. 1 is a view of an appearance of a display apparatus according to an embodiment of the present disclosure.

In the following description, like reference numerals refer to like elements throughout the specification. Well-known functions or constructions are not described in detail since they would obscure the one or more exemplary embodiments with unnecessary detail. Terms such as "unit", "module", "member", and "block" may be embodied as hardware or software. According to embodiments, a plurality of "units", "modules", "members", and "blocks" may be implemented as a single component or a single "unit", "module", "member", and "block" and may also include a plurality of components.

When an element is referred to as being "connected" to another element, it is directly or indirectly connected to the other element, wherein the indirect connection includes "connection via a wireless communication network".

Also, when a part "includes" or "comprises" an element, unless there is a particular description contrary thereto, the part may further include additional elements, not excluding the other elements.

When a first member is "on" a second member, the first member is in contact with the second member, but also includes when a third member between the first and second members.

Although the terms first, second, third, etc., may be used herein to describe various elements, the elements should not be limited by these terms. These terms are only used to distinguish one element from another element.

As used herein, the singular forms "a," "an" and "the" include the plural forms of the words, unless the context clearly indicates otherwise.

An identification code is used for the convenience of the description but is not intended to illustrate the order of each step. Each step may be implemented in an order different from the illustrated order unless the context clearly indicates otherwise.

Hereinafter exemplary embodiments of the present disclosure will be described in detail with reference to the accompanying drawings.

FIG. 1 is a view depicting a display apparatus according to one embodiment of the disclosure.

A display apparatus 10 is a device that processes an image signal received from an outside source and visually displays the processed image. Hereinafter an embodiment of a display apparatus 10 that is a television is described, but the disclosure is not limited thereto. For example, the display apparatus 10 may be implemented in various forms, such as a monitor, a portable multimedia device, and a portable communication device, and the display apparatus 10 is not limited in its shape as long as the display apparatus 10 visually displays an image.

The display apparatus 10 may be a large format display (LFD) installed outdoors, such as a roof of a building or a bus stop. The LFD display apparatus 10 is not limited to the outside of a building, and thus the display apparatus 10 may be installed in any place where the display apparatus is viewable by a large number of people, including indoors, in subway stations, shopping malls, movie theaters, companies, and stores.

The display apparatus 10 may receive content data including video data and audio data from various content sources and output video and audio corresponding to the video data and the audio data. For example, the display apparatus 10 may receive content data through a broadcast reception antenna or cable, receive content data from a content playback device, or receive content data from a content provider's content server.

As illustrated in FIG. 1, the display apparatus 10 includes a body 11, a screen 12 configured to display an image I, and a supporter 19 provided below the body 11 and configured to support the body 11.

The body 11 may form an appearance, e.g., a border, of the display apparatus 10, and the body 11 may include a component configured to allow the display apparatus 10 to display the image I and to perform various functions. Although the body 11 shown in FIG. 1 is in the form of a flat plate, the shape of the body 11 is not limited thereto. For example, the body 11 may have a curved plate shape.

The screen 12 may be formed on a front surface of the body 11, and display the image I. For example, the screen 12 may display a still image or a moving image. Further, the screen 12 may display a two-dimensional plane image or a three-dimensional image to the user by using binocular parallax.

A plurality of pixels P may be formed on the screen 12 and the image I displayed on the screen 12 may be formed by the light emitted from the plurality of pixels P. For example, a single still image may be formed on the screen 12 by combining light emitted from the plurality of pixels P as a mosaic.

Each of the plurality of pixels P may emit different brightness and different color of light. In order to emit different brightness of light, each of the plurality of pixels P may include a self-emission panel (for example, a light emitting diode panel) configured to directly emit light or a non-self-emission panel (for example, a liquid crystal panel) configured to transmit or block light emitted by a light source device.

To emit light in the various colors, the plurality of pixels P include sub-pixels $P_R$, $P_G$, and $P_B$, respectively.

The sub-pixels may include a red sub pixel $P_R$ for emitting red light, a green sub pixel $P_G$ for emitting green light, and a blue sub pixel $P_B$ for emitting blue light. For example, the red light may represent a light beam having a wavelength of approximately 620 nm (nanometers, one billionth of a meter) to 750 nm, the green light may represent a light beam having a wavelength of approximately 495 nm to 570 nm, and the blue light may represent a light beam having a wavelength of approximately 450 nm to 495 nm.

By combining the red light of the red sub pixel $P_R$, the green light of the green sub pixel $P_G$, and the blue light of the blue sub pixel $P_B$, each of the plurality of pixels P may emit different brightness and different color of light.

Figure 2:
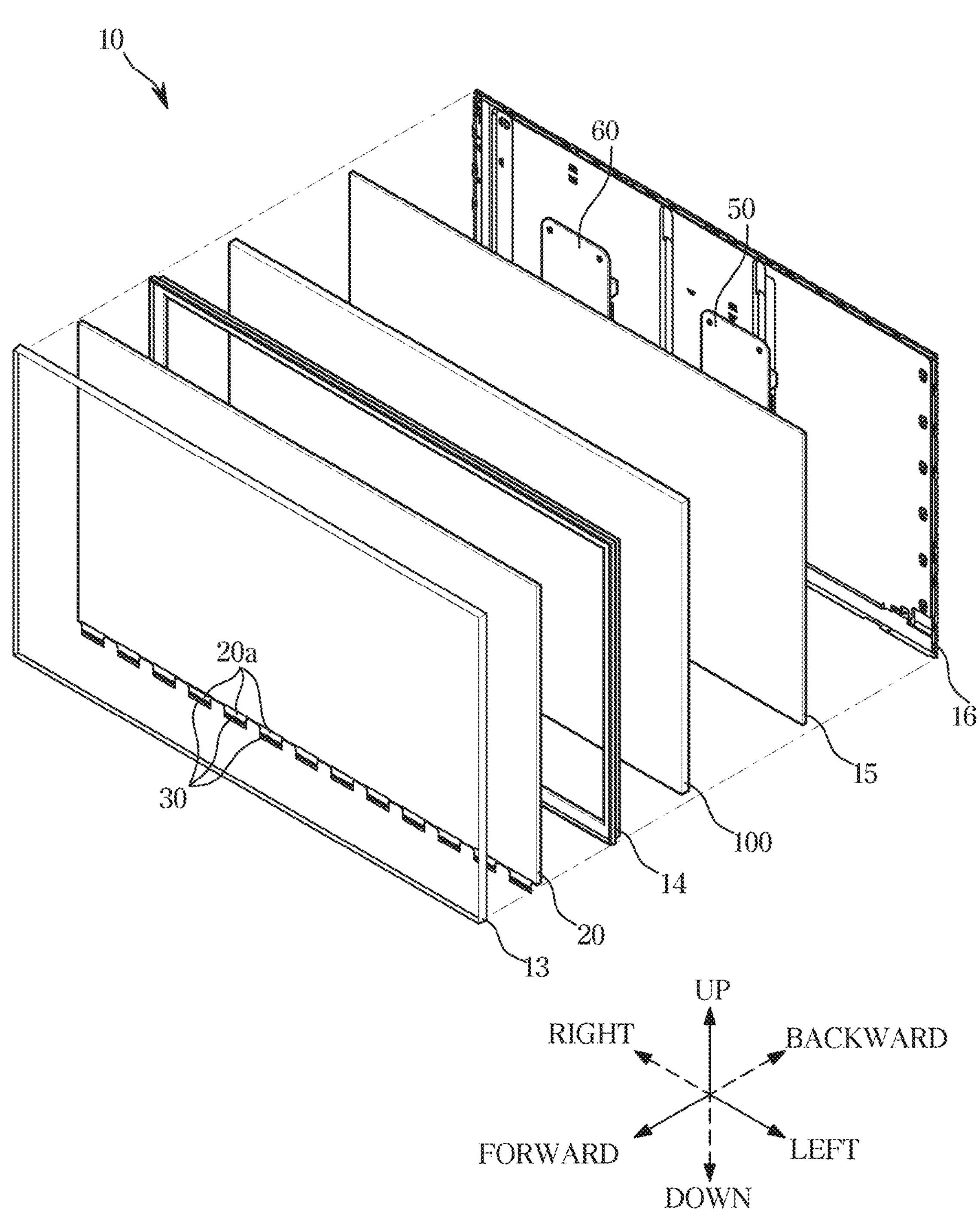
FIG. 2 is an exploded view of the display apparatus shown in FIG. 1 according to an embodiment.

FIG. 2 is an exploded view of the display apparatus shown in FIG. 1 according to an exemplary embodiment.

As shown in FIG. 2, various components configured to generate the image I on the screen S may be provided inside the body 11.

The body 11 includes a light source device 100 that is a surface light source, a liquid crystal panel 20 configured to block or transmit light emitted from the light source device 100, a control assembly 50 configured to control an operation of the light source device 100 and the liquid crystal panel 20, and a power assembly 60 configured to supply power to the light source device 100 and the liquid crystal panel 20. Further, the body 11 includes a bezel 13, a frame middle mold 14, a bottom chassis 15, and a rear cover 16 which are configured to support and fix the liquid crystal panel 20, the light source device 100, the control assembly 50, and the power assembly 60.

The light source device 100 may include a point light source configured to emit monochromatic light or white light. The light source device 100 may refract, reflect, and scatter light in order to convert light, which is emitted from the point light source, into uniform surface light. For example, the light source device 100 may include a plurality of light sources configured to emit monochromatic light or white light, a diffuser plate configured to diffuse light incident from the plurality of light sources, a reflective sheet configured to reflect light emitted from the plurality of light sources and a rear surface of the diffuser plate, and an optical sheet configured to refract and scatter light emitted from the front surface of the diffuser plate.

As mentioned above, the light source device 100 may refract, reflect, and scatter light emitted from the light source, thereby emitting uniform surface light toward the front.

A configuration of the light source device 100 will be described in more detail below.

Figure 3:
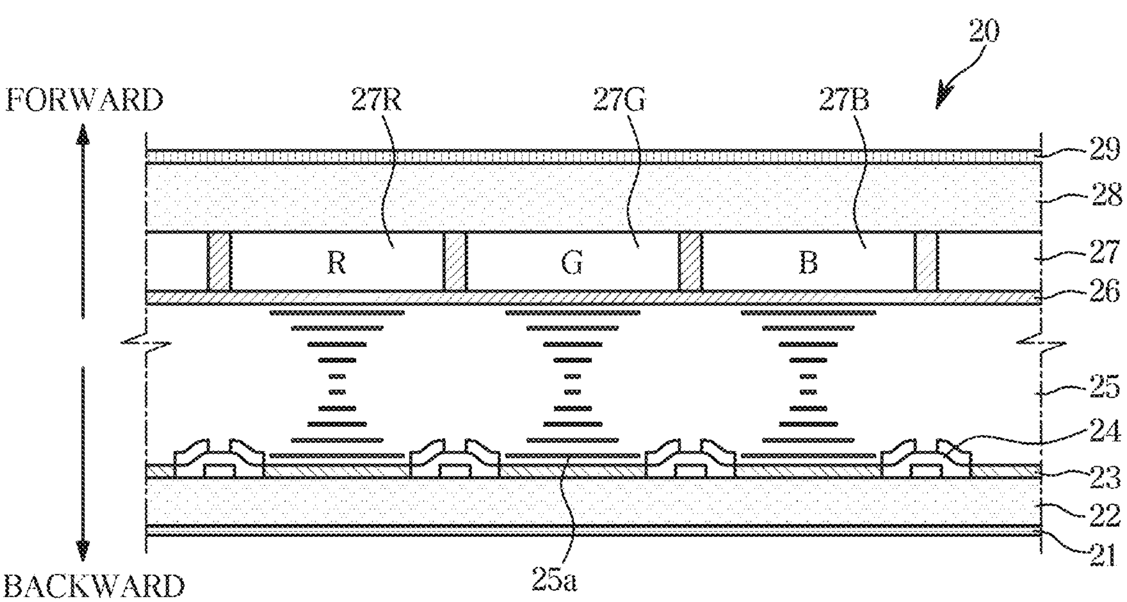
FIG. 3 is a side sectional view of a liquid crystal panel of the display apparatus shown in FIG. 2 according to an embodiment.

FIG. 3 is a side sectional view of a liquid crystal panel of the display apparatus shown in FIG. 2 according to an exemplary embodiment.

The liquid crystal panel 20 is provided in front of the light source device 100 and blocks or transmits light emitted from the light source device 100 to form the image I.

A front surface of the liquid crystal panel 20 may form the screen 12 of the display apparatus 10 described above, and the liquid crystal panel 20 may form the plurality of pixels P. In the liquid crystal panel 20, the plurality of pixels P may independently block or transmit light from the light source device 100, and the light transmitted through the plurality of pixels P may form the image I displayed on the screen 12.

For example, as shown in FIG. 3, the liquid crystal panel 20 may include a first polarizing film 21, a first transparent substrate 22, a pixel electrode 23, a thin film transistor 24, a liquid crystal layer 25, a common electrode 26, a color filter 27, a second transparent substrate 28, and a second polarizing film 29.

The first transparent substrate 22 and the second transparent substrate 28 may fixedly support the pixel electrode 23, the thin film transistor 24, the liquid crystal layer 25, the common electrode 26, and the color filter 27. The first and second transparent substrates 22 and 28 may be formed of tempered glass or transparent resin.

The first polarizing film 21 and the second polarizing film 29 are provided on the outside of the first and second transparent substrates 22 and 28.

Each of the first polarizing film 21 and the second polarizing film 29 may transmit a specific light beam and block other light beams. For example, the first polarizing film 21 transmits a light beam having a magnetic field vibrating in a first direction and blocks other light beams. In addition, the second polarizing film 29 transmits a light beam having a magnetic field vibrating in a second direction and blocks other light beams. In this case, the first direction and the second direction may be perpendicular to each other. Accordingly, a polarization direction of the light transmitted through the first polarizing film 21 and a vibration direction of the light transmitted through the second polarizing film 29 are perpendicular to each other. As a result, in general, light may not pass through the first polarizing film 21 and the second polarizing film 29 at the same time.

The color filter 27 may be provided inside the second transparent substrate 28.

The color filter 27 may include a red filter 27R transmitting red light, a green filter 27G transmitting green light, and a blue filter 27G transmitting blue light. The red filter 27R, the green filter 27G, and the blue filter 27B may be disposed parallel to each other. A region in which the color filter 27 is formed corresponds to the pixel P described above. A region in which the red filter 27R is formed corresponds to the red sub-pixel $P_R$, a region in which the green filter 27G is formed corresponds to the green sub-pixel $P_G$, and a region in which the blue filter 27B is formed corresponds to the blue sub-pixel $P_B$.

The pixel electrode 23 may be provided inside the first transparent substrate 22, and the common electrode 26 may be provided inside the second transparent substrate 28.

The pixel electrode 23 and the common electrode 26 may be formed of a metal material through which electricity is conducted, and the pixel electrode 23 and the common electrode 26 may generate an electric field to change the arrangement of liquid crystal molecules 25*a* forming the liquid crystal layer 25 as described below.

The pixel electrode 23 and the common electrode 26 may be formed of a transparent material, and may transmit light incident from the outside. For example, the pixel electrode 23 and the common electrode 26 may include indium tin oxide (ITO), indium zinc oxide (IZO), silver nanowire (Ag nano wire), carbon nanotube (CNT), graphene, or poly (3,4-ethylenedioxythiophene) (PEDOT).

The thin film transistor (TFT) 24 is provided inside the second transparent substrate 22.

The TFT 24 may transmit or block a current flowing through the pixel electrode 23. For example, an electric field may be formed or removed between the pixel electrode 23 and the common electrode 26 in response to turning on (closing) or turning off (opening) the TFT 24.

The TFT 24 may be formed of poly-silicon, and may be formed by semiconductor processes, such as lithography, deposition, and ion implantation.

The liquid crystal layer 25 is formed between the pixel electrode 23 and the common electrode 26, and the liquid crystal layer 25 is filled with the liquid crystal molecules 25*a*.

Liquid crystals represent an intermediate state between a solid (crystal) and a liquid. Most of the liquid crystal materials are organic compounds, and the molecular shape is in the shape of an elongated rod. The arrangement of molecules is in an irregular state in one direction, but may have a regular crystal shape in other directions. As a result, the liquid crystal has both the fluidity of the liquid and the optical anisotropy of the crystal (solid).

In addition, liquid crystals also exhibit optical properties according to changes in an electric field. For example, in the liquid crystal, the direction of the arrangement of molecules forming the liquid crystal may change according to a change in an electric field. In response to an electric field being generated in the liquid crystal layer 25, the liquid crystal molecules 25*a* of the liquid crystal layer 25 may be arranged according to the direction of the electric field. If the electric field is not being generated in the liquid crystal layer 25, the liquid crystal molecules 25*a* may be arranged irregularly or arranged along an alignment layer (not shown). As a result, the optical properties of the liquid crystal layer 25 may vary depending on the presence or absence of the electric field passing through the liquid crystal layer 25.

A cable 20*a* configured to transmit image data to the liquid crystal panel 20, and a display driver integrated circuit (hereinafter referred to as 'driver IC') 30 configured to process digital image data and output an analog image signal are provided at one side of the liquid crystal panel 20.

The cable 20*a* may electrically connect the control assembly 50 and/or the power assembly 60 to the driver IC 30, and may also electrically connect the driver IC 30 to the liquid crystal panel 20. The cable 20*a* may include a flexible flat cable or a film cable that is bendable.

The driver IC 30 may receive image data and power from the control assembly 50 and/or the power assembly 60 through the cable 20*a*. The driver IC 30 may transmit the image data and driving current to the liquid crystal panel 20 through the cable 20*a*.

In addition, the cable 20*a* and the driver IC 30 may be integrally implemented as a film cable, a chip on film (COF), or a tape carrier package (TCP). In other words, the driver IC 30 may be disposed on the cable 20*b*. However, the disclosure is not limited thereto, and the driver IC 30 may be disposed on the liquid crystal panel 20.

The control assembly 50 may include a control circuit configured to control an operation of the liquid crystal panel 20 and the light source device 100. The control circuit may process image data received from an external content source, transmit the image data to the liquid crystal panel 20, and transmit dimming data to the light source device 100.

The power assembly 60 may supply power to the liquid crystal panel 20 and the light source device 100 to allow the light source device 100 to output surface light and to allow the liquid crystal panel 20 to block or transmit the light of the light source device 100.

The control assembly 50 and the power assembly 60 may be implemented as a printed circuit board and various circuits mounted on the printed circuit board. For example, the power circuit may include a capacitor, a coil, a resistance element, a processor, and a power circuit board on which the capacitor, the coil, the resistance element, and the processor are mounted. Further, the control circuit may include a memory, a processor, and a control circuit board on which the memory and the processor are mounted.

Hereinafter the light source device 100 will be described.

Figure 4:
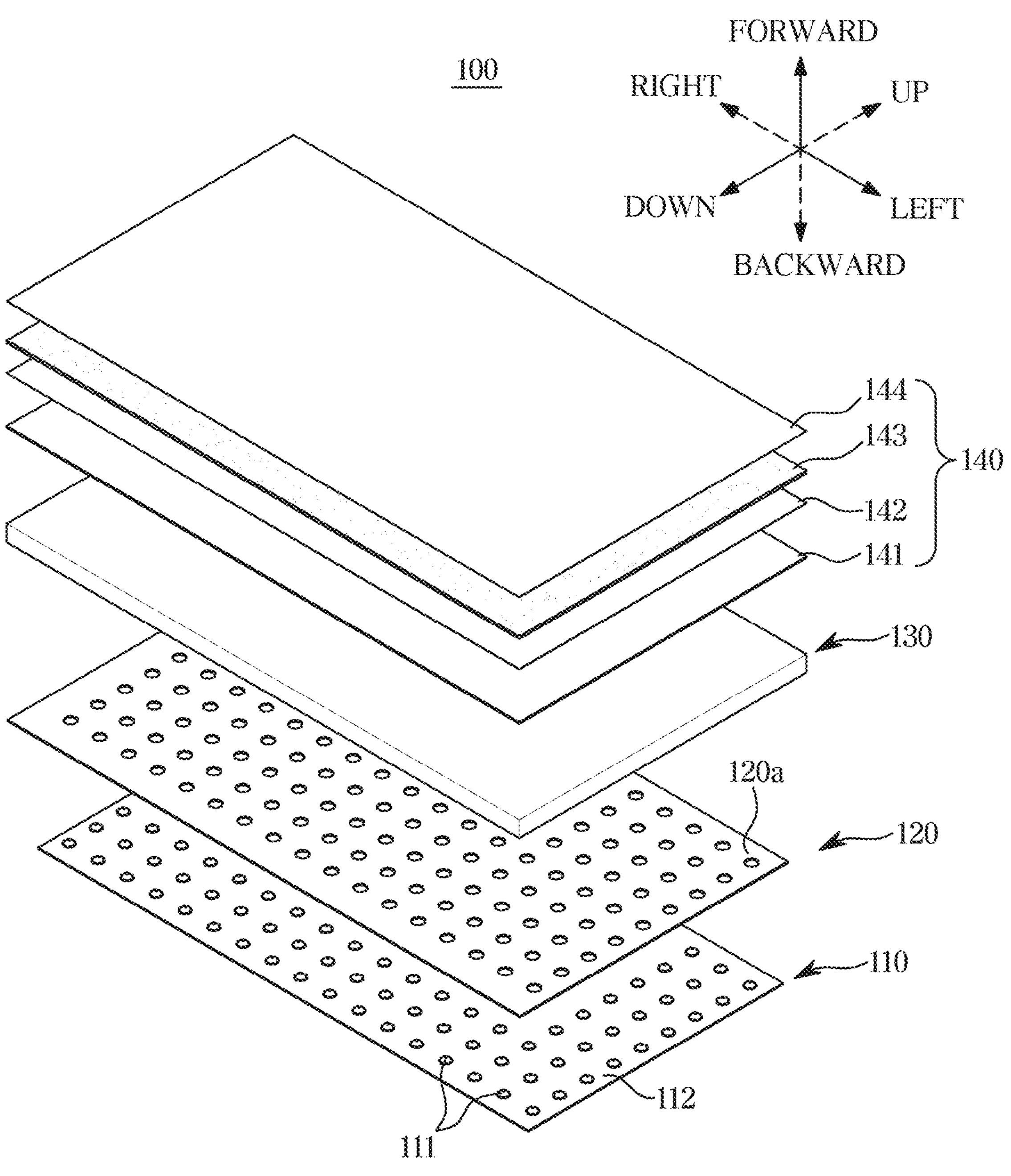
FIG. 4 is an exploded view of a light source device shown in FIG. 2 according to an embodiment.
Figure 5:
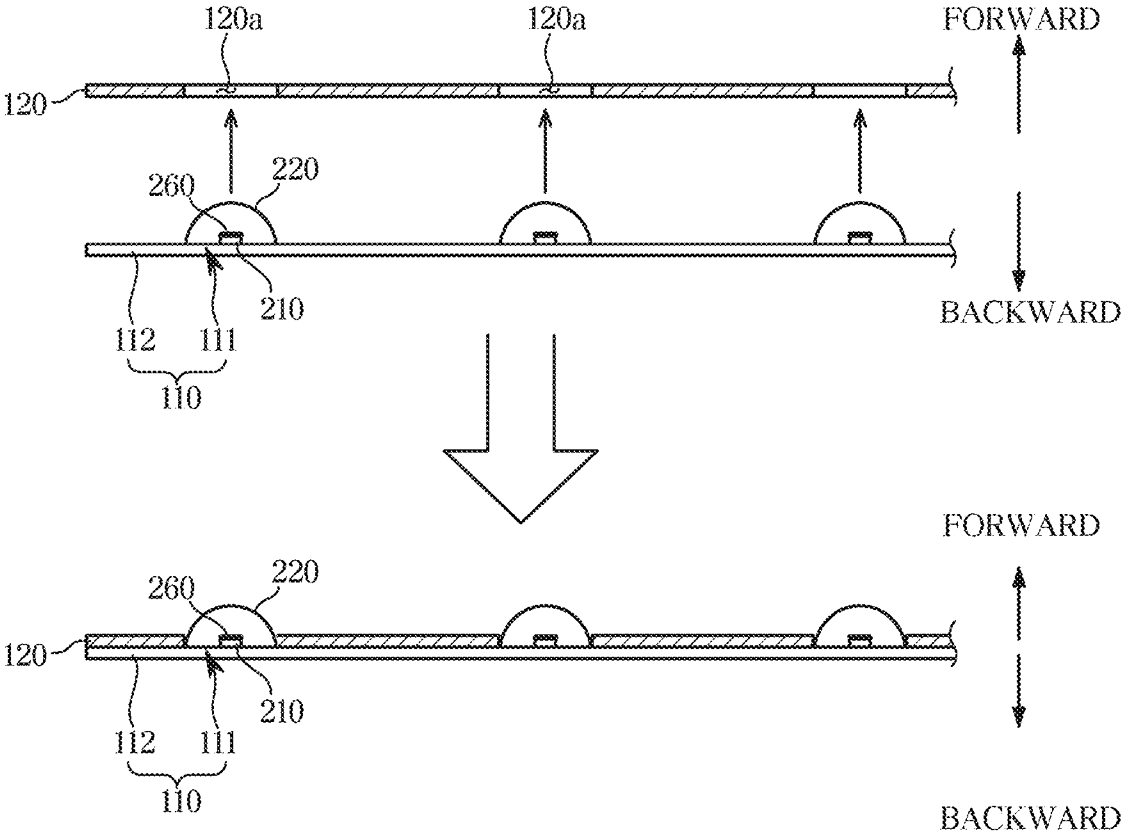
FIG. 5 is a view illustrating coupling between a light source module included in the light source device, and a reflective sheet according to an embodiment.

FIG. 4 is an exploded view of a light source device shown in FIG. 2 according to an exemplary embodiment. FIG. 5 is a view illustrating coupling between a light source module included in the light source device, and a reflective sheet.

The light source device 100 includes a light source module 110 configured to generate light, a reflective sheet 120 configured to reflect light, a diffuser plate 130 configured to uniformly diffuse light, and an optical sheet 140 configured to improve luminance of light that is emitted.

The light source module 110 may include a plurality of light sources 111 configured to emit light, and a substrate 112 configured to support the plurality of light sources 111.

The plurality of light sources 111 may be arranged in a predetermined pattern to allow light to be emitted with uniform luminance. The plurality of light sources 111 may be arranged in such a way that a distance between one light source and light sources adjacent thereto is the same.

For example, as shown in FIG. 4, the plurality of light sources 111 may be arranged in rows and columns. Accordingly, the plurality of light sources may be arranged such that an approximately square is formed by four adjacent light sources. In addition, any one light source may be disposed adjacent to four light sources, and a distance between one light source and four adjacent light sources may be approximately the same.

Alternatively, the plurality of light sources may be disposed in a plurality of rows, and a light source belonging to each row may be disposed at the center of two light sources belonging to an adjacent row. Accordingly, the plurality of light sources may be arranged such that an approximately equilateral triangle is formed by three adjacent light sources. In this case, one light source may be disposed adjacent to six light sources, and a distance between one light source and six adjacent light sources may be approximately the same.

However, the pattern in which the plurality of light sources 111 is disposed is not limited to the pattern described above, and the plurality of light sources 111 may be disposed in various patterns to allow light to be emitted with uniform luminance.

The light source 111 may employ an element configured to emit monochromatic light (light of a specific wavelength, for example, blue light) or white light (for example, a light of a mixture of red light, green light, and blue light) in various directions by receiving power. For example, the light source 111 may include a light emitting diode (LED).

The substrate 112 may fix the plurality of light sources 111 to prevent a change in the position of the light source 111. Further, the substrate 112 may supply power, which is for the light source 111 to emit light, to the light source 111.

The substrate 112 may support the plurality of light sources 111 and may be configured with synthetic resin, tempered glass, or a printed circuit board (PCB) on which a conductive power supply line for supplying power to the light source 111 is formed.

The reflective sheet 120 may reflect light emitted from the plurality of light sources 111 forward or in a direction close to the forward direction.

In the reflective sheet 120, a plurality of through holes 120*a* are formed at positions corresponding to each of the plurality of light sources 111 of the light source module 110. In addition, the light source 111 of the light source module

110 may pass through the through hole 120_a_ and protrude to the front of the reflective sheet 120.

For example, as shown in the upper portion of FIG. 5, in the process of assembling the reflective sheet 120 and the light source module 110, the plurality of light sources 111 of the light source module 110 are inserted into the through holes 120_a_ formed on the reflective sheet 120. Accordingly, as shown in the lower portion of FIG. 5, the substrate 112 of the light source module 110 may be located behind the reflective sheet 120, but the plurality of light sources 111 of the light source module 110 may be located in front of the reflective sheet 120.

Accordingly, the plurality of light sources 111 may emit light in front of the reflective sheet 120.

The plurality of light sources 111 may emit light in various directions from the front of the reflective sheet 120. The light may not only be emitted toward the diffuser plate 130 from the light source 111, but also may be emitted toward the reflective sheet 120 from the light source 111. The reflective sheet 120 may reflect light, which is emitted toward the reflective sheet 120, toward the diffuser plate 130.

Light emitted from the light source 111 passes through various objects, such as the diffuser plate 130 and the optical sheet 140. Among incident light beams passing through the diffuser plate 130 and the optical sheet 140, some of the incident light beams are reflected from the surfaces of the diffuser plate 130 and the optical sheet 140. The reflective sheet 120 may reflect light reflected by the diffuser plate 130 and the optical sheet 140.

The diffuser plate 130 may be provided in front of the light source module 110 and the reflective sheet 120, and may evenly distribute the light emitted from the light source 111 of the light source module 110.

As described above, the plurality of light sources 111 are located in various places on the rear surface of the light source device 100. Although the plurality of light sources 111 are disposed at equal intervals on the rear surface of the light source device 100, unevenness in luminance may occur depending on the positions of the plurality of light sources 111.

The diffuser plate 130 may diffuse light emitted from the plurality of light sources 111 within the diffuser plate 130 in order to remove unevenness in luminance caused by the plurality of light sources 111. In other words, the diffuser plate 130 may uniformly emit uneven light of the plurality of light sources 111 to the front surface.

The optical sheet 140 may include various sheets for improving luminance and uniformity of luminance. For example, the optical sheet 140 may include a diffusion sheet 141, a first prism sheet 142, a second prism sheet 143, and a reflective polarizing sheet 144.

The diffusion sheet 141 diffuses light for uniformity of luminance. The light emitted from the light source 111 may be diffused by the diffuser plate 130 and may be diffused again by the diffusion sheet 141 included in the optical sheet 140.

The first and second prism sheets 142 and 143 may increase luminance by condensing light diffused by the diffusion sheet 141. The first and second prism sheets 142 and 143 include a prism pattern in the shape of a triangular prism, and a plurality of prism patterns are arranged adjacent to each other to form a plurality of strips.

The reflective polarizing sheet 144 is a type of polarizing film and may transmit some of the incident light beams and reflect others for improving the luminance. For example, the reflective polarizing sheet 144 may transmit polarized light in the same direction as a predetermined polarization direction of the reflective polarizing sheet 144, and may reflect polarized light in a direction different from the polarization direction of the reflective polarizing sheet 144. In addition, the light reflected by the reflective polarizing sheet 144 is recycled inside the light source device 100, and thus the luminance of the display apparatus 10 may be improved by the light recycling.

The optical sheet 140 is not limited to the sheet or film shown in FIG. 4, and may include more various sheets or films, such as a protective sheet.

Figure 6:
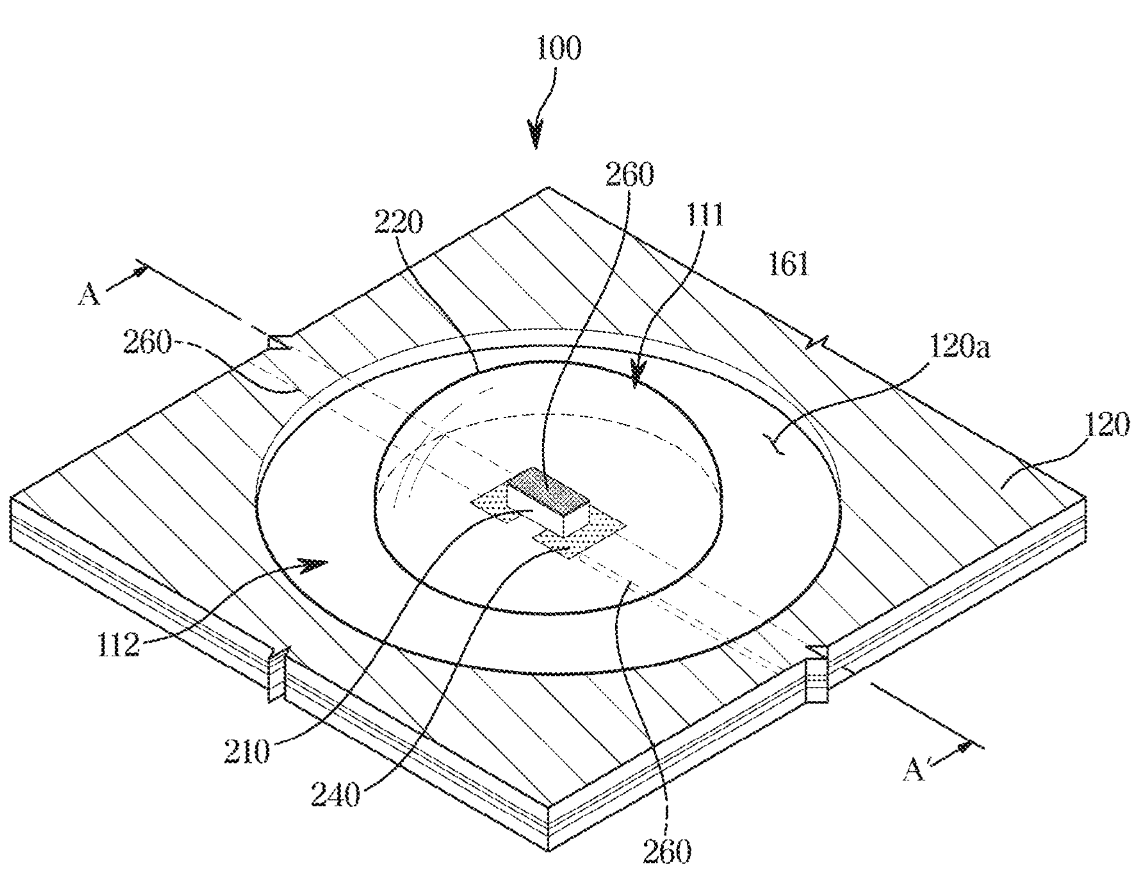
FIG. 6 is a perspective view of a light source included in the light source device shown in FIG. 4 according to an embodiment.
Figure 7:
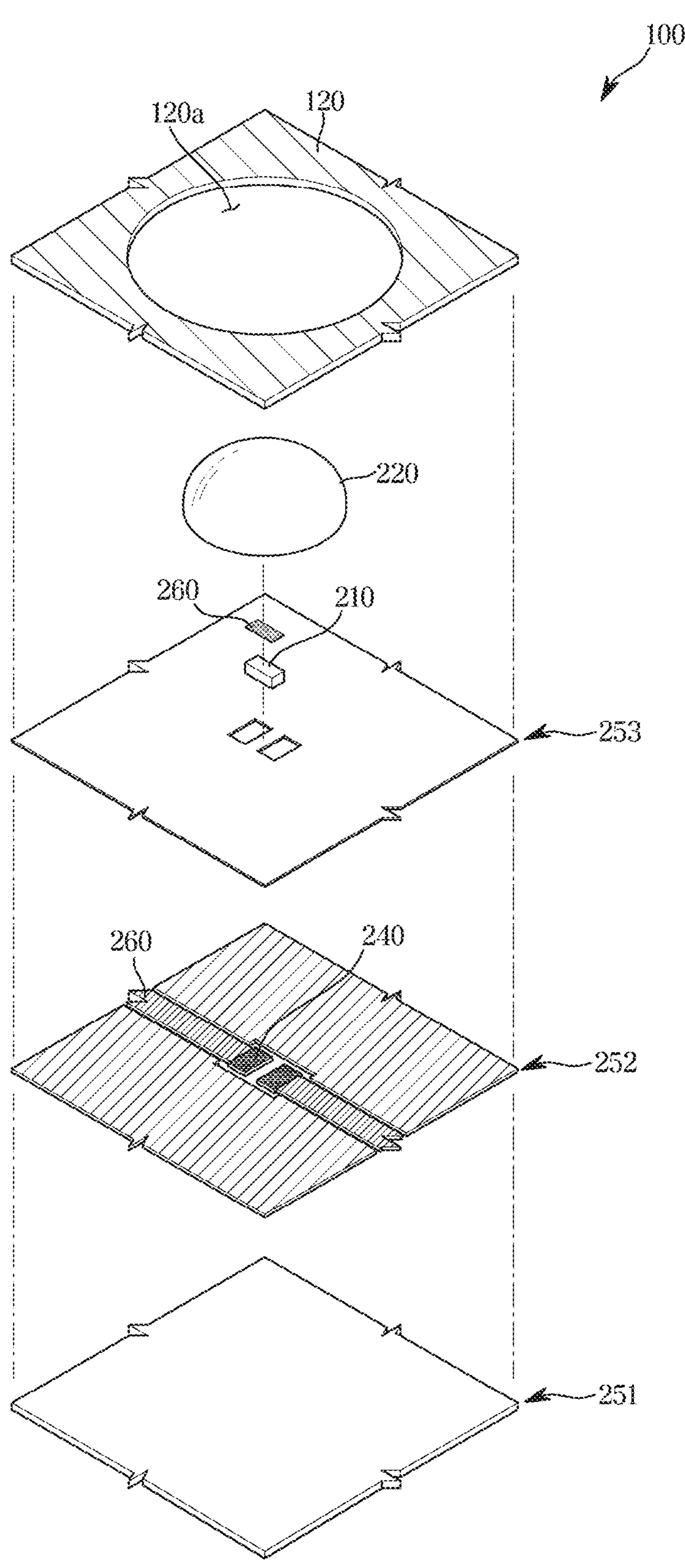
FIG. 7 is an exploded view of the light source shown in FIG. 6 according to an embodiment.
Figure 8:
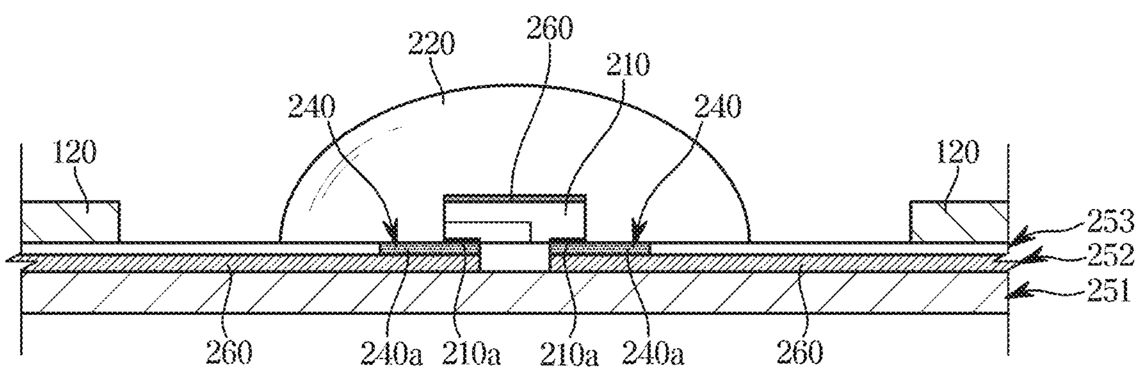
FIG. 8 is a sectional view taken along line A-A' shown in FIG. 6 according to an embodiment.

FIG. 6 is a perspective view of a light source included in the light source device shown in FIG. 4 according to an exemplary embodiment. FIG. 7 is an exploded view of the light source shown in FIG. 6 according to an exemplary embodiment. FIG. 8 is a sectional view taken along line A-A' shown in FIG. 6 according to an exemplary embodiment.

The light source 111 of the light source device 100 will be described with reference to FIGS. 6 to 8.

As described above, the light source module 110 includes the plurality of light sources 111. The plurality of light sources 111 may protrude forward of the reflective sheet 120 from the rear of the reflective sheet 120 by passing through the through hole 120_a_. Accordingly, as shown in FIGS. 6 and 7, the light source 111 and a part of the substrate 112 may be exposed toward the front of the reflective sheet 120 through the through hole 120_a_.

The light source 111 may include an electrical/mechanical structure positioned in a region defined by the through hole 120_a_ of the reflective sheet 120.

Each of the plurality of light sources 111 may include a light emitting diode 210, an optical dome 220, and a reflective layer 260.

The light emitting diode 210 may include a P-type semiconductor and an N-type semiconductor for emitting light by recombination of holes and electrons. In addition, the light emitting diode 210 is provided with a pair of electrodes 210_a_ for supplying hole and electrons to the P-type semiconductor and the N-type semiconductor, respectively.

The light emitting diode 210 may convert electrical energy into optical energy. In other words, the light emitting diode 210 may emit light having a maximum intensity at a predetermined wavelength to which power is supplied. For example, the light emitting diode 210 may emit blue light having a peak value at a wavelength indicating blue (for example, a wavelength between 430 nm and 495 nm).

The light emitting diode 210 may be directly attached to the substrate 112 in a Chip On Board (COB) method. In other words, the light source 111 may include the light emitting diode 210 to which a light emitting diode chip or a light emitting diode die is directly attached to the substrate 112 without an additional packaging.

To reduce the size of the light source 111, the light source module 110 may be manufactured such that a flip-chip type light emitting diode 210 is attached to the substrate 112 in a chip-on-board method.

On the substrate 112, a power supply line 230 and a power supply pad 240 for supplying power to the flip-chip type light emitting diode 210 is provided.

On the substrate 112, the power supply line 230 for supplying electrical signals and/or power to the light emitting diode 210 from the control assembly 50 and/or the power assembly 60 is provided.

As shown in FIG. 8, the substrate 112 may be formed by alternately stacking an insulation layer 251 that is non-conductive and a conduction layer 252 that is conductive.

A line or pattern, through which power and/or electrical signals pass, is formed on the conduction layer 252. The conduction layer 252 may be formed of various materials having electrical conductivity. For example, the conduction layer 252 may be formed of various metal materials, such as copper (Cu), tin (Sn), aluminum (Al), or an alloy thereof.

A dielectric of the insulation layer 251 may insulate between lines or patterns of the conduction layer 252. The insulation layer 251 may be formed of a dielectric for electrical insulation, for example, FR-4.

The power supply line 230 may be implemented by a line or pattern formed on the conduction layer 252.

The power supply line 230 may be electrically connected to the light emitting diode 210 through the power supply pad 240.

The power supply pad 240 may be formed in such a way that the power supply line 230 is exposed to the outside.

A protection layer 253 may be formed in the outermost part of the substrate 112 to prevent or suppress damages caused by an external impact, chemical action (for example, corrosion, etc.), and/or an optical action. The protection layer 253 may include a photo solder resist (PSR).

As shown in FIG. 8, the protection layer 253 may cover the power supply line 230 to prevent the power supply line 230 from being exposed to the outside.

A window may be formed in the protection layer 253 to expose a part of the power supply line 230 to the outside to facilitate electrical contact between the power supply line 230 and the light emitting diode 210. A part of the power supply line 230 exposed to the outside through the window of the protection layer 253 may form the power supply pad 240.

A conductive adhesive material 240*a* for the electrical contact between the power supply line 230 exposed to the outside and the electrode 210*a* of the light emitting diode 210 is applied to the power supply pad 240. The conductive adhesive material 240*a* may be applied within the window of the protection layer 253.

The electrode 210*a* of the light emitting diode 210 is in contact with the conductive adhesive material 240*a*, and the light emitting diode 210 may be electrically connected to the power supply line 230 through the conductive adhesive material 240*a*.

The conductive adhesive material 240*a* may include a solder having electrical conductivity. However, the disclosure is not limited thereto, and the conductive adhesive material 240*a* may include electrically conductive epoxy adhesives.

Power may be supplied to the light emitting diode 210 to cause the light emitting diode 210 to emit light through the power supply line 230 and the power supply pad 240, and in response to the supply of the power. A pair of power supply pads 240 corresponding to each of the pair of electrodes 210*a* provided in the flip chip type light emitting diode 210 may be provided.

The optical dome 220 may cover the light emitting diode 210. The optical dome 220 may prevent or suppress damages to the light emitting diode 210 caused by an external mechanical action and/or damage to the light emitting diode 210 caused by chemical action.

The optical dome 220 may have a dome shape formed in such a way that a sphere is cut into a surface not including the center thereof, or may have a hemispherical shape in such a way that a sphere is cut into a surface including the center thereof. A vertical cross section of the optical dome 220 may be a bow shape or a semicircle shape.

The optical dome 220 may be formed of silicone or epoxy resin. For example, the molten silicon or epoxy resin may be discharged onto the light emitting diode 210 through a nozzle, and the discharged silicon or epoxy resin may be cured, thereby forming the optical dome 220.

Accordingly, the shape of the optical dome 220 may vary depending on the viscosity of the liquid silicone or epoxy resin. For example, when the optical dome 220 is manufactured using silicon having a thixotropic index of about 2.7 to 3.3 (appropriately, 3.0), the optical dome 220 is formed with a dome ratio (a height of the dome/a diameter of a base), which indicates a ratio of a height of a dome with respect to a diameter of a base of the dome, of approximately 0.25 to 0.31 (appropriately 0.28). For example, the optical dome 220 formed of silicon having a thixotropic index of approximately 2.7 to 3.3 (appropriately, 3.0) may have a diameter of approximately 2.5 mm and a height of approximately 0.7 mm.

The optical dome 220 may be optically transparent or translucent. Light emitted from the light emitting diode 210 may be emitted to the outside by passing through the optical dome 220.

In this case, the dome-shaped optical dome 220 may refract light like a lens. For example, light emitted from the light emitting diode 210 may be refracted by the optical dome 220 and thus may be dispersed.

As mentioned above, the optical dome 220 may disperse light emitted from the light emitting diode 210 as well as protecting the light emitting diode 210 from external mechanical and/or chemical or electrical actions.

The reflective layer 260 may be positioned in front of the light emitting diode 210. The reflective layer 260 may be disposed on the front surface of the light emitting diode 210. The reflective layer 260 may be a multilayer reflective structure in which a plurality of insulation layers having different refractive indices is alternately stacked. For example, the multilayer reflective structure may be a Distributed Bragg Reflector (DBR) in which a first insulation layer having a first refractive index and a second insulation layer having a second refractive index are alternately stacked.

Figure 9:
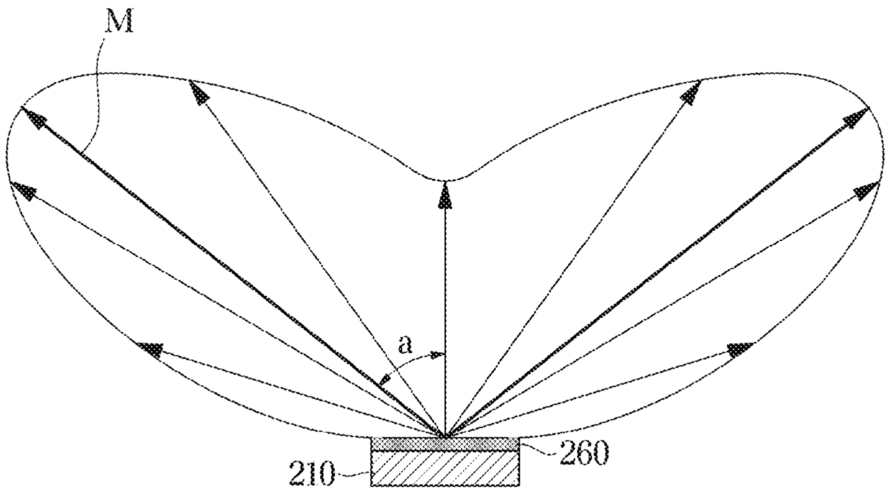
FIG. 9 is a view illustrating a profile of light emitted from a light emitting diode shown in FIG. 8 according to an embodiment.

FIG. 9 is a view illustrating a profile of light emitted from a light emitting diode shown in FIG. 8 according to an exemplary embodiment.

Specifically, a profile of light, which is light output information of light emitted from the center of the light emitting diode 210 shown in FIG. 8, is illustrated in FIG. 9. Referring to FIG. 9, light emitted from the light emitting diode 210 may be diffused and emitted by the reflective layer 260 having reflective properties. In FIG. 9, the arrows indicate the brightness of light where a longer arrow represents a greater brightness of light. In the profile of light shown in FIG. 9, a longer arrow represents a larger amount of light emission, and a direction in which a larger amount of light is emitted represents a greater brightness. In FIG. 9, a direction of a longest arrow, a direction in which a largest amount of light is emitted, i.e., a direction in which a greatest brightness is represented may be defined as a main optical path (M).

Particularly, the main optical path M of the light emitting diode 210 may have an angle (a) that is greater than or equal to 50° but less than or equal to 65° with respect to a front and rear direction. In an exemplary embodiment, the front and rear direction is an optical axis. That is, the angle between the main optical paths M may be greater than or equal to 100° but less than or equal to 130°. Preferably, but not necessarily, the main optical path M of the light emitting diode 210 may have an angle of 54° with respect to the front-rear direction. That is, the angle between the main optical paths M of the light emitting diode 210 may be 108°.

Figure 10:
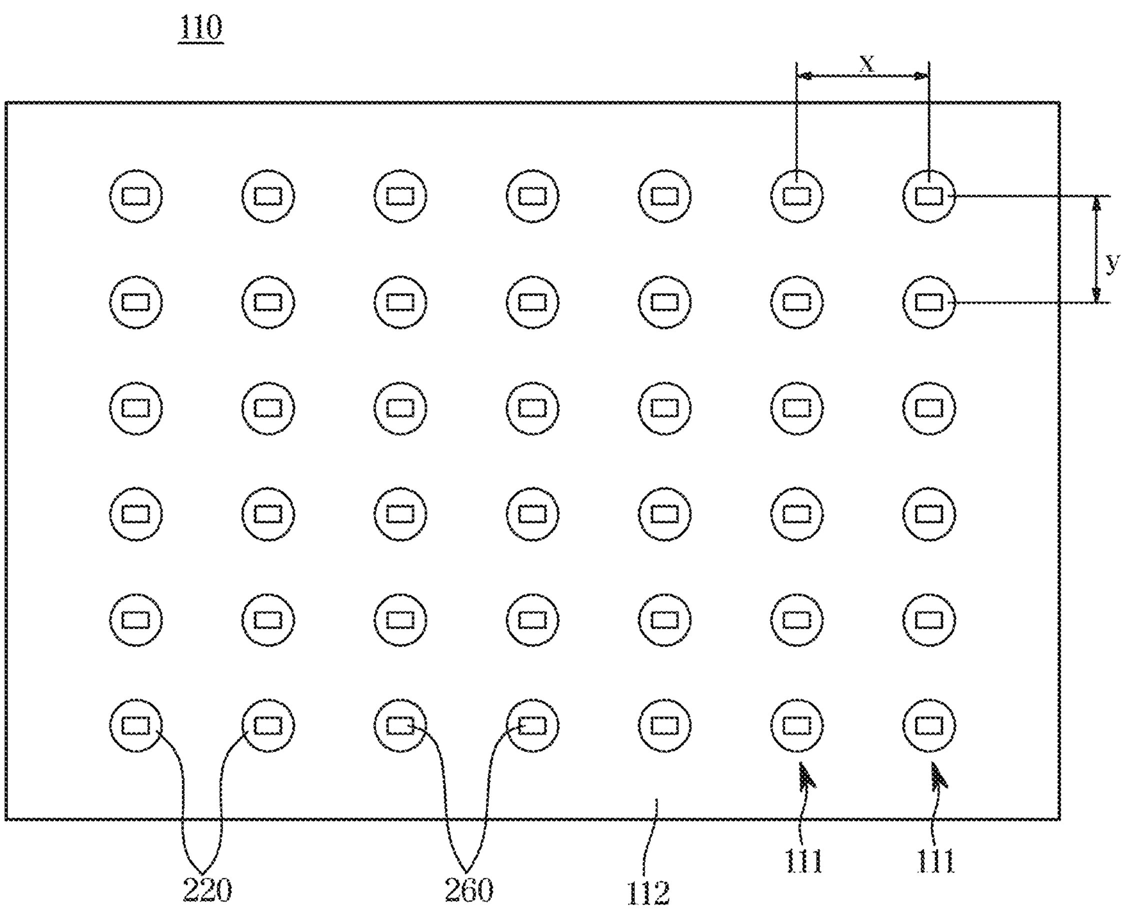
FIG. 10 is a view illustrating a front surface of the light source module shown in FIG. 4 according to an embodiment.
Figure 11:
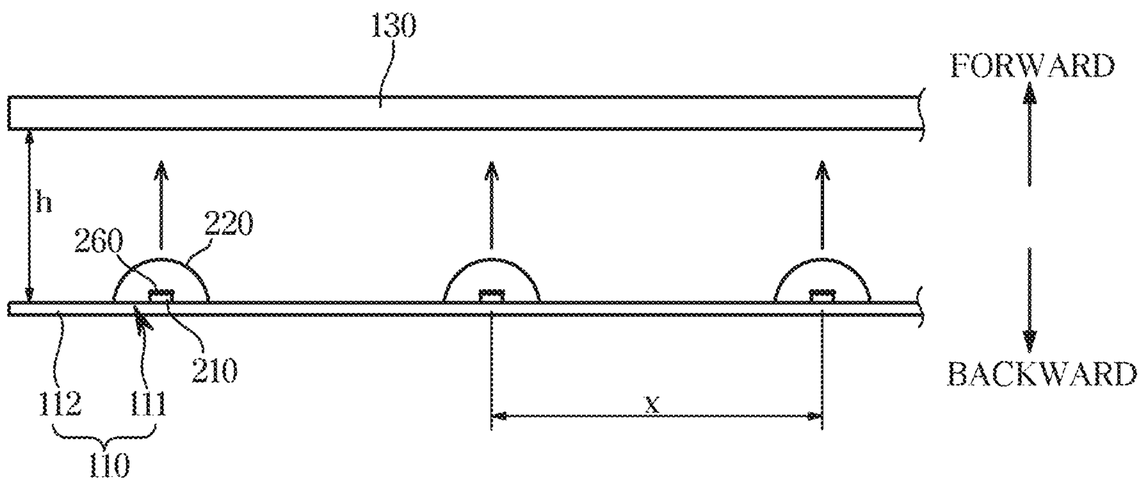
FIG. 11 is a view illustrating a relationship between the light source module shown in FIG. 4 and a diffuser plate according to an embodiment.

FIG. 10 is a view illustrating a front surface of the light source module shown in FIG. 4 according to an exemplary embodiment. FIG. 11 is a view illustrating a relationship between the light source module shown in FIG. 4 and a diffuser plate according to an exemplary embodiment.

Hereinafter a distance between the approximately centers of each of the plurality of light emitting diodes 210 may be referred to as pitches x and y, and a distance between the diffuser plate 130 and the substrate 112 may be referred to as an optical distance (OD) h.

A pitch x of the plurality of light sources 111 in the left and right direction may be greater than or equal to 4 mm but less than or equal to 14 mm. Particularly, the pitch x of the centers of each of the plurality of light sources 111 in the left and right direction may be greater than or equal to 4 mm but less than or equal to 14 mm.

In addition, a pitch y of the plurality of light sources 111 in the up and down direction may be greater than or equal to 4 mm but less than or equal to 14 mm. Particularly, the pitch y of the centers of each of the plurality of light sources 111 in the up and down direction may be greater than or equal to 4 mm but less than or equal to 14 mm.

The pitch x of the centers of each of the plurality of light sources 111 in the left and right direction may be different from the pitch y of the centers of each of the plurality of light sources 111 in the up and down direction. The pitch x of the centers of each of the plurality of light sources 111 in the left and right direction may be greater than the pitch y of the centers of each of the plurality of light sources 111 in the up and down direction, but may be less than or equal to 1.1 times of the pitch y of the centers of each of the plurality of light sources 111 in the up and down direction. Alternatively, the pitch x of the centers of each of the plurality of light sources 111 in the left and right direction may be substantially the same as the pitch y of the centers of each of the plurality of light sources 111 in the up and down direction. The pitch x in the left and right direction and the pitch y in the up and down direction may satisfy the following expression:

$$(\text{second distance}) \le (\text{first distance}) \le 1.1 * (\text{second distance}).$$

Referring to FIG. 11, the optical distance h between the substrate 112 and the diffuser plate 130 may be greater than or equal to 1.5 mm but less than or equal to 4.5 mm. Particularly, a distance from the front surface of the substrate 112 to the rear surface of the diffuser plate 130 through the air layer may be greater than or equal to 1.5 mm but less than or equal to 4.5 mm.

The light source device 100 according to an embodiment of the present disclosure may be provided to allow the pitch x of the centers of each of the plurality of light sources 111 in the left and right direction and the optical distance h between the substrate 112 and the diffuser plate 130 to satisfy the following expression. That is, in the light source device 100 according to an embodiment of the present disclosure, the pitch of the centers of each of the plurality of light sources 111 in the left and right direction may be greater than or equal to 4 mm but less than or equal to 14 mm, and the optical distance h between the substrate 112 and the diffuser plate 130 may be greater than or equal to 1.5 mm but less than or equal to 4.5 mm as shown by the following expression:

$$2.2 \le (x)/h \le 4.5.$$

Particularly, when the pitch x of the centers of each of the plurality of light sources 111 in the left and right direction is 1.1 times the pitch y in the up and down direction, and when the optical distance h between the substrate 112 and the diffuser plate 130 is greater than or equal to 1.5 mm but less than or equal to 2.5 mm, the pitch x and the optical distance h may satisfy the following expression:

$$3.5 \le (x)_{max}/h \le 4.5.$$

In addition, when the pitch x of the centers of each of the plurality of light sources 111 in the left and right direction is 1.1 times the pitch y in the up and down direction, and when the optical distance h between the substrate 112 and the diffuser plate 130 is greater than or equal to 2.5 mm but less than or equal to 3.5 mm, the pitch x and the optical distance h may satisfy the following expression:

$$3.2 \le (x)_{max}/h \le 4.2.$$

In addition, when the pitch x in of the centers of each of the plurality of light sources 111 the left and right direction is 1.1 times the pitch y in the up and down direction, and when the optical distance h between the substrate 112 and the diffuser plate 130 is greater than or equal to 3.5 mm but less than or equal to 4.5 mm, the pitch x and the optical distance h may satisfy the following expression:

$$2.2 \le (x)_{max}/h \le 3.5.$$

Preferably, but not necessarily, when the pitch x of the centers of each of the plurality of light sources 111 in the left and right direction is 1.1 times the pitch y of the centers of each of the plurality of light sources 111 in the up and down direction, and the optical distance h between the substrate 112 and the diffuser plate 130 is greater than or equal to 3.5 mm but less than or equal to 4.5 mm, the pitch x and the optical distance h may satisfy the following expression:

$$2.5 \le (x)_{max}/h \le 3.5.$$

Additionally, the display apparatus 10 according to an embodiment of the present disclosure may be provided such that the optical distance h may be set to 3 mm, and the pitch x may be set to 9.8 mm. Accordingly, the ratio of the pitch x to the optical distance h may be approximately 3.27.

As for the display apparatus 10 according to an embodiment of the present disclosure, the optical distance h may be set to 3.1 mm, and the pitch x may be set to 11 mm. Accordingly, the ratio of the pitch x to the optical distance h may be approximately 3.55.

Due to this configuration, the light source device 100 according to an embodiment of the present disclosure and the display apparatus 10, it is possible to reduce the number of light sources in the display apparatus 10, thereby securing cost competitiveness by minimizing the cost of the display apparatus 10. In addition, the light source device 100 according to an embodiment of the present disclosure and the display apparatus 10, it is possible to reduce the optical distance h, thereby reducing the thickness of the display device 10.

Figure 12:
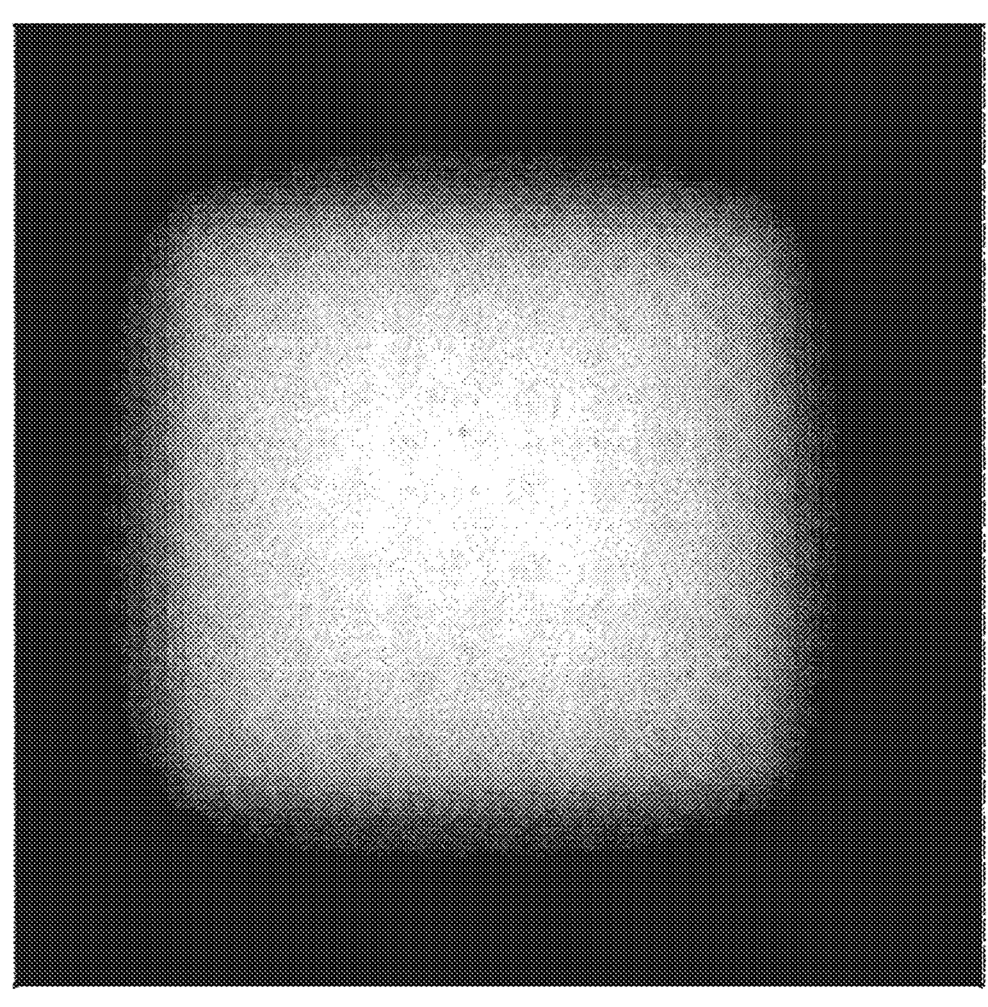
FIG. 12 is a view illustrating an experimental result when a numerical range of a pitch/an optical distance of a display apparatus is out of a numerical range according to an embodiment.
Figure 13:
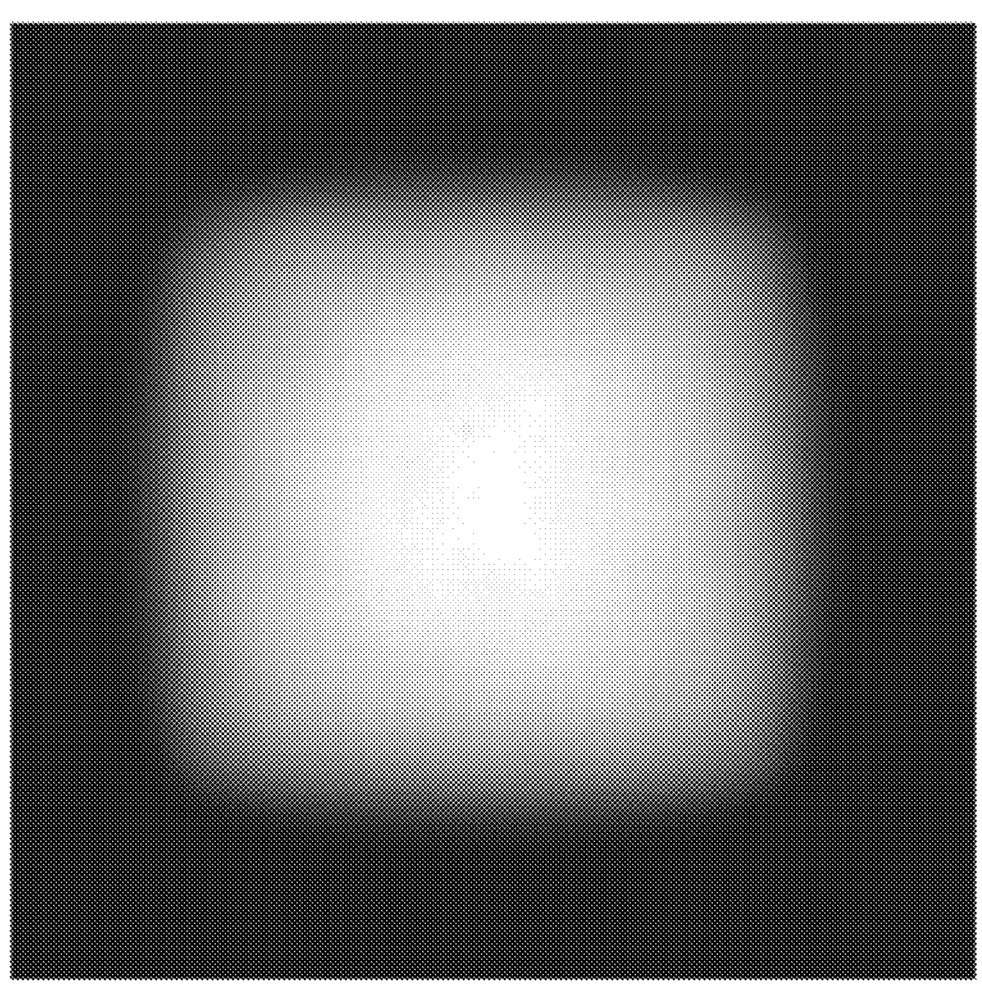
FIG. 13 is a view illustrating an experimental result when a numerical range of a pitch/an optical distance of a display apparatus is within a numerical range according to an embodiment.

FIG. 12 is a view illustrating an experimental result when a numerical range of a pitch/an optical distance of a display apparatus is out of a numerical range according to an embodiment of the present disclosure. FIG. 13 is a view illustrating an experimental result when a numerical range of a pitch/an optical distance of a display apparatus is within a numerical range according to an embodiment of the present disclosure.

Referring to FIG. 12, a moire phenomenon noticeably occurs when the ratio of the pitch x to the optical distance h of the light source devices of the display apparatus 100 is out of the numerical range below:

$$2.5 < (x)/h < 4.5.$$

In contrast, as shown in FIG. 13, a moire phenomenon is remarkably eliminated when the ratio of the pitch x to the optical distance h of the light source devices of the display apparatus 100 preferably, but not necessarily, satisfies the numerical range below:

$$2.5 < (x)/h < 4.5.$$

While the present disclosure has been particularly described with reference to exemplary embodiments, it should be understood by those of skilled in the art that various changes in form and details may be made without departing from the spirit and scope of the present disclosure.

What is claimed is:

1. A light source device comprising:

a diffuser plate; and a light source module comprising:

a substrate; and a plurality of light emitting diodes (LEDs) on the substrate; and wherein the plurality of LEDs are arranged along a first direction and a second direction perpendicular to the first direction, wherein, when a distance between centers of adjacent LEDs of the plurality of LEDs is defined as a pitch, and a distance between the diffuser plate and the substrate is defined as an optical distance, a ratio of the pitch to the optical distance satisfies the following expression:

$$2.5 \leq \text{pitch/optical distance} \leq 4.5, \text{ and}$$

wherein a first pitch of the adjacent LEDs in the first direction and a second pitch of the adjacent LEDs in the second direction satisfy the following expression:

$$(\text{second pitch}) \leq (\text{first pitch}) \leq 1.1 * (\text{second pitch}).$$

2. The light source device of claim 1 further comprising:

a plurality of reflective layers, each of the plurality of reflective layers provided on a respective front surface of each of the plurality of LEDs; and wherein each of the plurality of reflective layers comprises a Distributed Bragg Reflector (DBR).

3. The light source device of claim 1, wherein the first pitch and the second pitch are greater than or equal to 4 mm but less than or equal to 14 mm.

4. The light source device of claim 1, wherein the optical distance is greater than or equal to 1.5 mm but less than or equal to 4.5 mm.

5. The light source device of claim 1, wherein when the optical distance is greater than or equal to 1.5 mm but less than or equal to 2.5 mm, the ratio of the first pitch to the optical distance satisfies the following expression:

$$3.2 \leq \text{first pitch/optical distance} \leq 4.2.$$

6. The light source device of claim 1, wherein when the optical distance is greater than or equal to 2.5 mm but less than or equal to 3.5 mm, the ratio of the first pitch to the optical distance satisfies the following expression:

$$2.5 \leq \text{first pitch/optical distance} \leq 3.5.$$

7. The light source device of claim 1, wherein when the optical distance is greater than or equal to 3.5 mm but less than or equal to 4.5 mm, the ratio of the first pitch to the optical distance satisfies the following expression:

$$2.5 \leq \text{second pitch/optical distance} \leq 3.5.$$

8. The light source device of claim 1, wherein the light source module further comprises:

a plurality of optical domes, each of the plurality of optical domes provided on a respective one of the plurality of LEDs;

wherein the plurality of optical domes are formed of silicone or epoxy resin.

9. The light source device of claim 1, wherein the plurality of LEDs are configured to emit blue light.

10. The light source device of claim 1, wherein the ratio of the first pitch to the optical distance satisfies the following expression:

$$2.5 \leq \text{first pitch/optical distance} \leq 3.5.$$

11. The light source device of claim 1, wherein the ratio of the second pitch to the optical distance satisfies the following expression:

$$2.5 \leq \text{second pitch/optical distance} \leq 3.5.$$

12. The light source device of claim 1, wherein
the ratio of the first pitch to the optical distance satisfies the following expression:

$$2.5 \leq \text{pitch/optical distance} \leq 4.0.$$

13. The light source device of claim 1, wherein
the ratio of the second pitch to the optical distance satisfies the following expression:

$$2.5 \leq \text{pitch/optical distance} \leq 4.0.$$

14. The light source device of claim 1, wherein
the first pitch is greater than the second pitch.

15. The light source device of claim 1, wherein the light source module is provided behind the diffuser plate.

16. The light source device of claim 1, wherein the light source module is configured to emit light towards the diffuser plate.

17. The light source device of claim 1, wherein the light source module further comprises:
a plurality of optical domes, each of the plurality of optical domes provided on a respective one of the plurality of LEDs.

18. The light source device of claim 1, wherein the light source module further comprises:
a plurality of optical domes, each of the plurality of optical domes covers a respective one of the plurality of LEDs.

19. The light source device of claim 18, wherein the plurality of optical domes are formed of silicone or epoxy resin.

* * * * *